INVENTOR
RONALD L. HEIN 3,430,837
ANTI-STICK AUTOMATIC WELDING TIP
Ronald L. Hein, 1008 22nd Ave. Court,
Greeley, Colo. 80631
Filed July 27, 1967, Ser. No. 656,446
U.S. Cl. 228—53                    7 Claims
Int. Cl. B23k 3/04

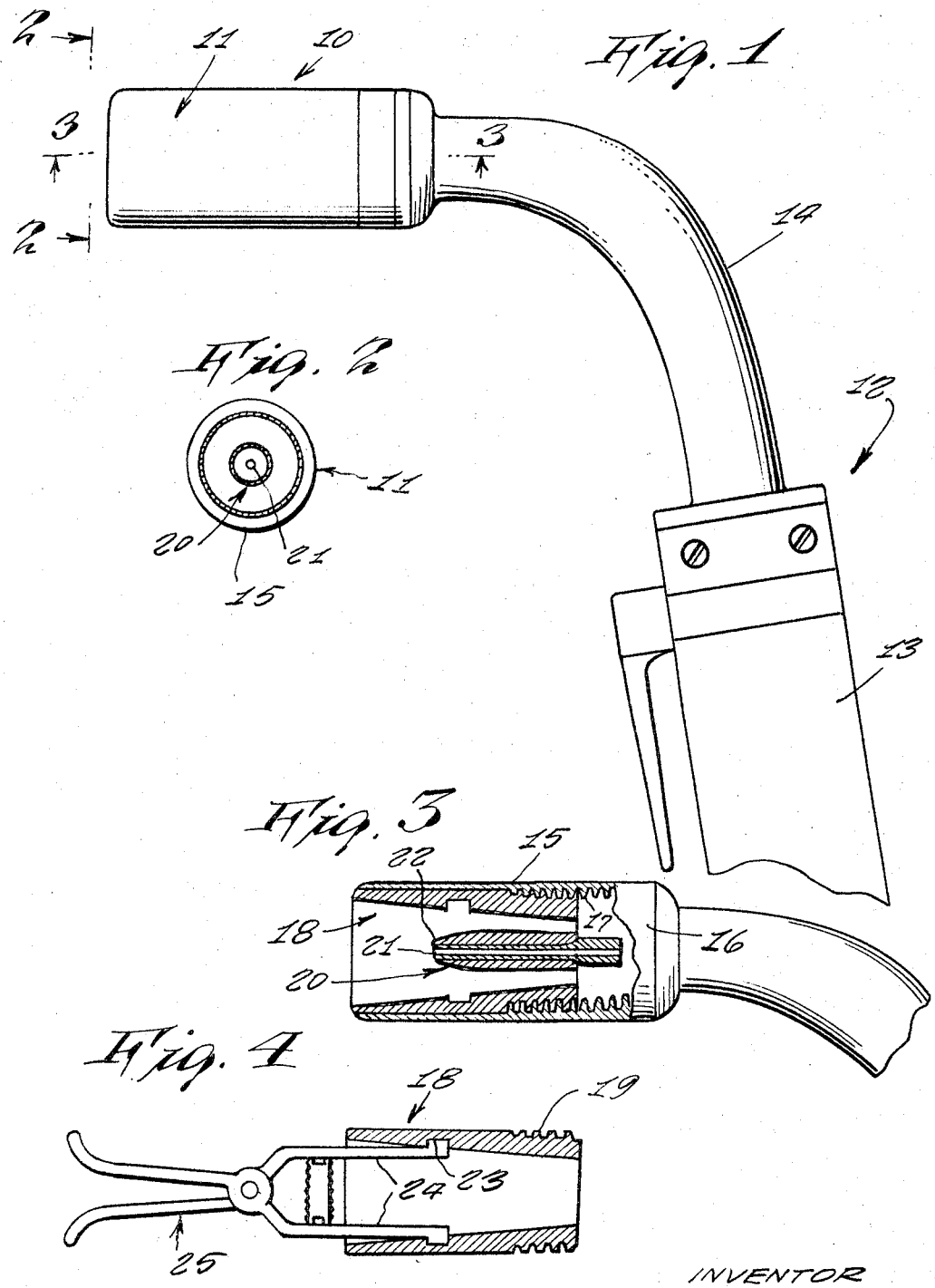

ABSTRACT OF THE DISCLOSURE

A welding tip which is provided with a novel type of coating upon the inside parts so as to prevent splattering metal from sticking thereto or becoming built up therearound, thus saving on maintenance and repair of the welding tip as well as eliminating the stopping of the automatic feed of welding wire.

---

This invention relates generally to welding equipment. More specifically it relates to welding tips.

A principal object of the present invention is to provide an improved welding tip that includes a coating upon the inside parts thereof so as to produce a welding tip to which splattered metal will not stick or build up therearound.

Another object of the present invention is to provide an improved welding tip having a coating on the inside parts thereof and which will save upon maintenance and repair of the welding tip.

Yet another object of the present invention is to provide an improved welding tip having a coating on the inside parts thereof wherein the lack of metal build-up will accordingly not stop the automatic feed of welding wire.

Still a further object of the present invention is to provide an improved welding tip having a coating on the inside parts thereof and wherein the coating may be of any of three types of materials, such coating comprising either Teflon, ceramics or pyrolytic graphite.

Other objects of the present invention are to provide an improved welding tip having a coating on the inside parts thereof which is simple in design, inexpensive to manufacture, rugged in construction, easy to use and efficient in operation.

These and other objects will be readily evident upon a study of the following specification and the accompanying drawing wherein:

FIGURE 1 is a side elevation view of a welding tip incorporating the present invention;

FIGURE 2 is an end elevation view thereof as viewed on line 2—2 of FIGURE 1;

FIGURE 3 is a cross-sectional view taken on the line 3—3 of FIGURE 1;

FIGURE 4 is a cross-sectional view of the insert shown in FIGURE 3 and being shown supported upon a tool that is used to remove the insert from the head of the tip in case the former becomes damaged;

Figure 5:
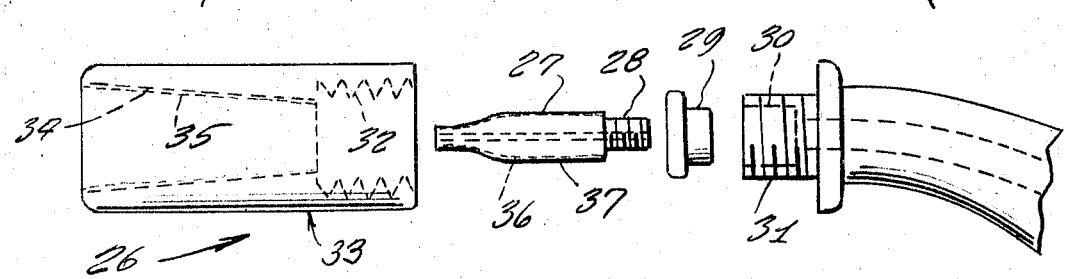
FIGURE 5 is an exploded, side-elevation view of the parts that comprise the welding tip.

Referring now to the drawings in detail, the reference numeral 10 represents an improved welding tip, according to the present invention, wherein there is a welding head 11 supported at the end of a handle unit 12, comprising handle 13 and curved neck 14.

As is shown in FIGURE 3 of the drawing, the welding head 11 includes a sleeve 15 secured to a base 16 by means of threads 17, the threads 17 extending sufficiently so as to also engage an insert 18 which is provided with external threads 19 near its base end for engagement with threads 17. It is to be noted that the threads are of coarse type. A tip 20 is centrically mounted at its one end in the base 16, the tip having an elongated central opening 21 extending therethrough for purpose of holding a welding wire protruding therefrom.

In the present invention the tip 20 is coated with a high temperature ceramic or pyrolytic graphite 22 either of which will withstand the intense heat of the welding operation; for insert 18 is likewise coated upon all of its surfaces with a like coating as is applied to the tip 20.

The insert 18 is provided with recesses 23 into which the prongs 24 of a tool 25 are receivable when it is desired to unscrew the insert from the sleeve 15 of the head 11. Use of the tool 25 would be necessary in case the ceramic insert 18 should become damaged and in need of replacement.

Figure 6:
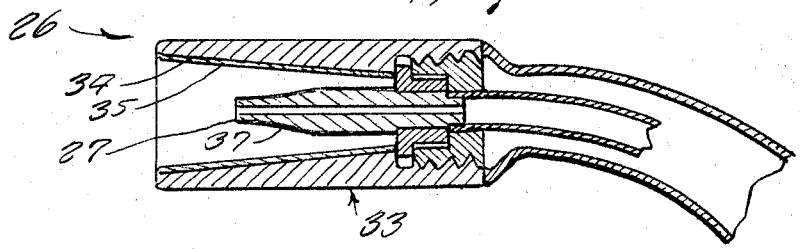
FIGURE 6 is a side cross-sectional view thereof shown assembled.

Now referring to FIGURES 5 and 6, a welding head assembly 26 is shown of a modified construction wherein there is a tip 27 which is threadingly engageable by means of threads 28 within an adapter 29 that is receivable within an opening 30 of an extension 31. The extension 31 is externally threaded and is threadingly engageable with threads 32 of a nozzle 33. In the present construction, the nozzle 33 is equivalent to the sleeve and insert illustrated in FIGURE 3 of the drawing. In the present modification, the conical configurated inner surface 44 of the nozzle is coated with either pyrolytic graphite or Teflon 35. In the present construction, the tip 27 comprises a wire guide that is to be coated upon its external surface 36 with a like coating of Teflon or pyrolytic graphite 37. The nozzle 33 may be made from ceramic material, if so preferred, in view that ceramic has a relatively high percentage of breakage during normal welding use.

Figure 7:
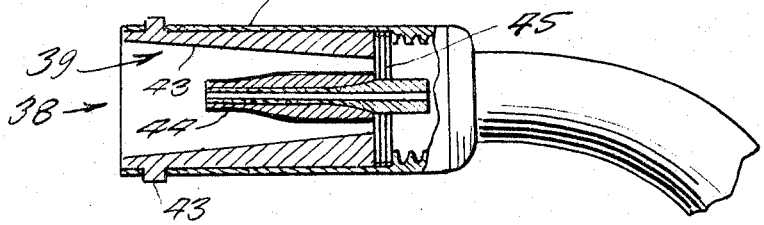
FIGURE 7 is a side elevation view shown partly in cross section of a modified form of tip construction.
Figure 8:
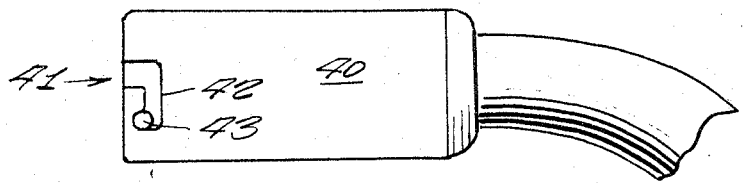
FIGURE 8 is a side elevation view of the construction shown in FIGURE 7.
Figure 9:
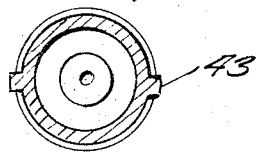
FIGURE 9 is a cross-sectional view taken on the line 9—9 of FIGURE 8.

Referring now to FIGURES 7 to 9, a welding head 38 is shown which includes an insert 39 that is secured to sleeve 40 by means of a bayonette lock 41 wherein there is a U-shaped slot 42 upon opposite sides of the sleeve 40 and into which prongs 43 formed upon the insert 39 are receivable. A spring 45 provides tension to maintain the insert engaged in the bayonet lock, as shown in FIGURE 7. It is to be noted that the bayonet slots are located equally diametrically apart so that the insert may be placed therein conveniently. In the present construction the insert is coated upon all its surfaces with a high temperature ceramic or pyrolytic graphite 43 and the wire guide tip 44 is likewise coated on its surface with a like coating material.

Thus there has been shown an anti-stick automatic welding tip which will prevent the build-up from splattering metal upon its vital surfaces.

While various changes may be made in the detailed construction it is understood that such changes will be within the spirit and scope of the present invention as is defined by the appended claims.

I claim:

1. In an improved welding head, the combination of a nozzle, said nozzle being secured to an extension of a handle unit, said handle unit including a handle member and a curved neck, said neck having an end extension forming a base for supporting said nozzle, a wire guide tip centrally supported on said base, and said nozzle and said tip being provided with coating means to prevent build-up of splattering metal thereupon.

2. The combination as set forth in claim 1 wherein said means comprises a coating applied to the outer surface of said wire guide tip and to an inner surface of said nozzle, said coating having anti-stick characteristics of splattering metal thereto.

3. The combination as set forth in claim 2 wherein said comprises Teflon material.

4. The combination as set forth in claim 2 wherein said coating comprises of pyrolytic graphite.

5. The combination as set forth in claim 2 wherein said coating comprises ceramic material.

6. The combination as set forth in claim 2 wherein said nozzle is comprised of an outer sleeve threaded on said base and an insert threaded within said sleeve, said insert having said coated inner surface.

7. The combination as set forth in claim 6 wherein said insert is secured to said sleeve by a bayonet lock.

References Cited

UNITED STATES PATENTS 2,491,165   12/1949   Rugeris _____ 228—53

RICHARD H. EANES, JR., *Primary Examiner.*